Feb. 3, 1953 J. P. WHELAN 2,627,104
MACHINE FOR PRODUCING COVERS AND OPENER LEVER ASSEMBLIES
Filed Feb. 20, 1947
17 Sheets-Sheet 2

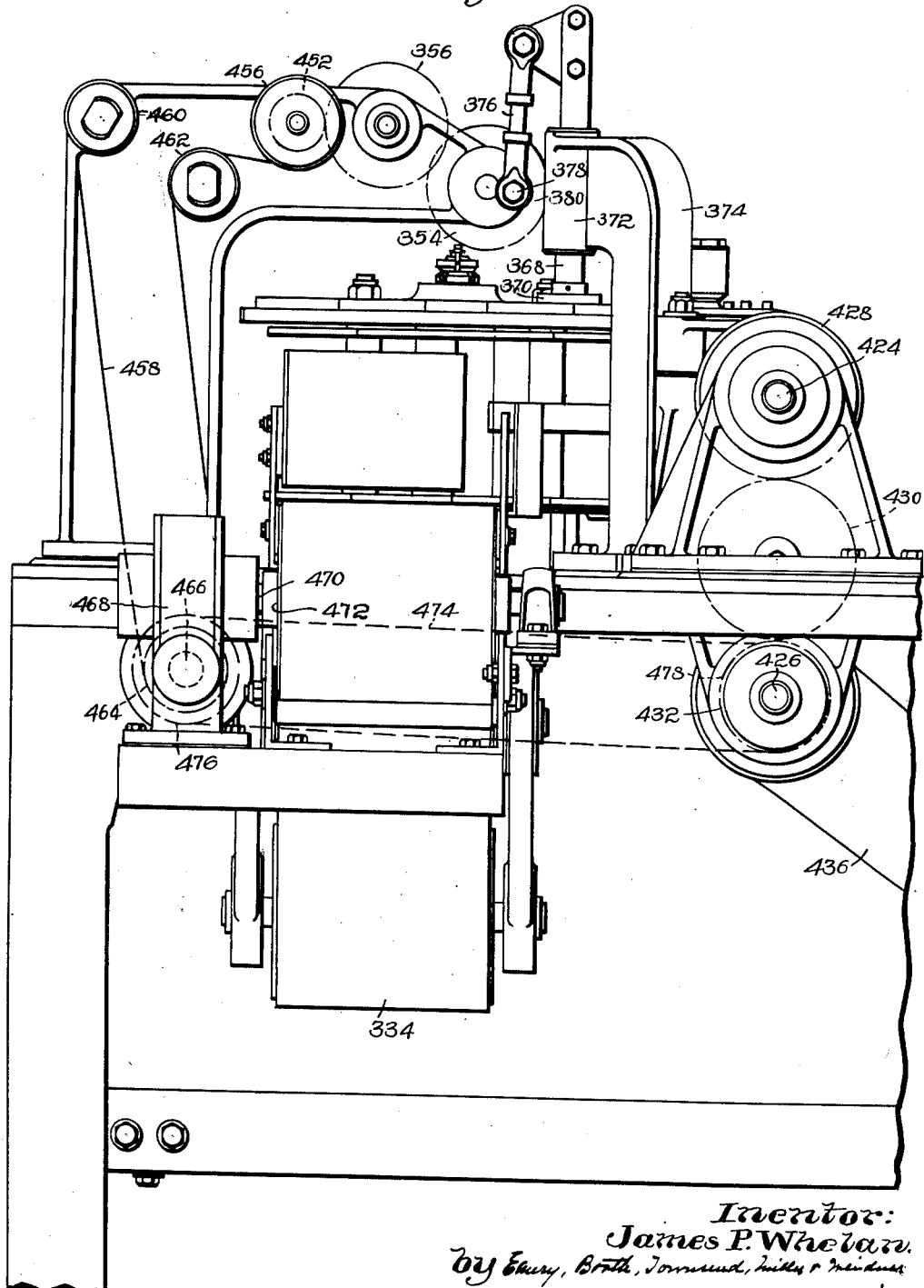

Inventor:
James P. Whelan
by Emery, Booth, Townsend, Miller, & Weidner
Attys

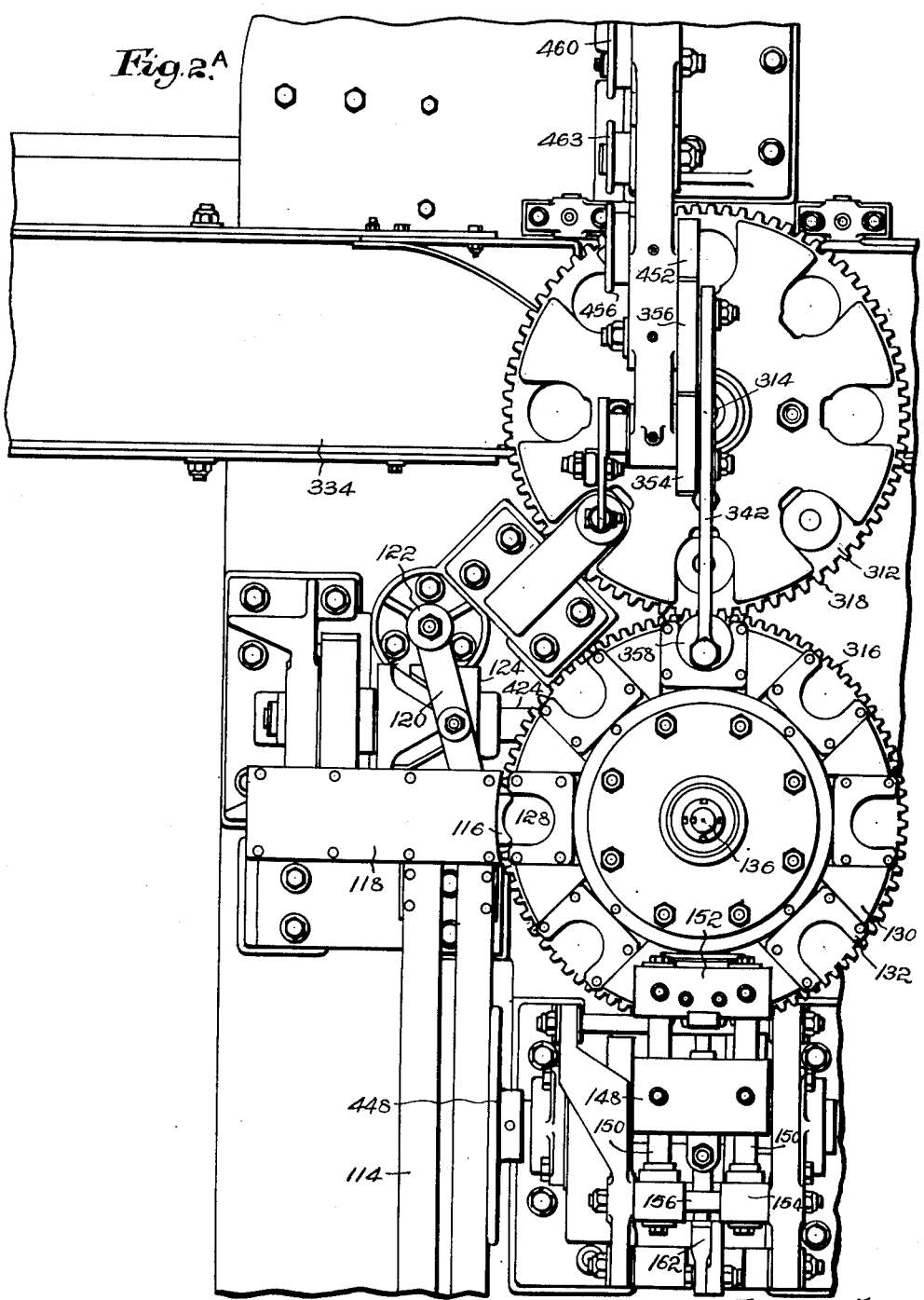

Feb. 3, 1953 — J. P. WHELAN — 2,627,104
MACHINE FOR PRODUCING COVERS AND OPENER LEVER ASSEMBLIES
Filed Feb. 20, 1947 — 17 Sheets-Sheet 4

Inventor:
James P. Whelan
Attys

Feb. 3, 1953 J. P. WHELAN 2,627,104
MACHINE FOR PRODUCING COVERS AND OPENER LEVER ASSEMBLIES
Filed Feb. 20, 1947 17 Sheets-Sheet 5
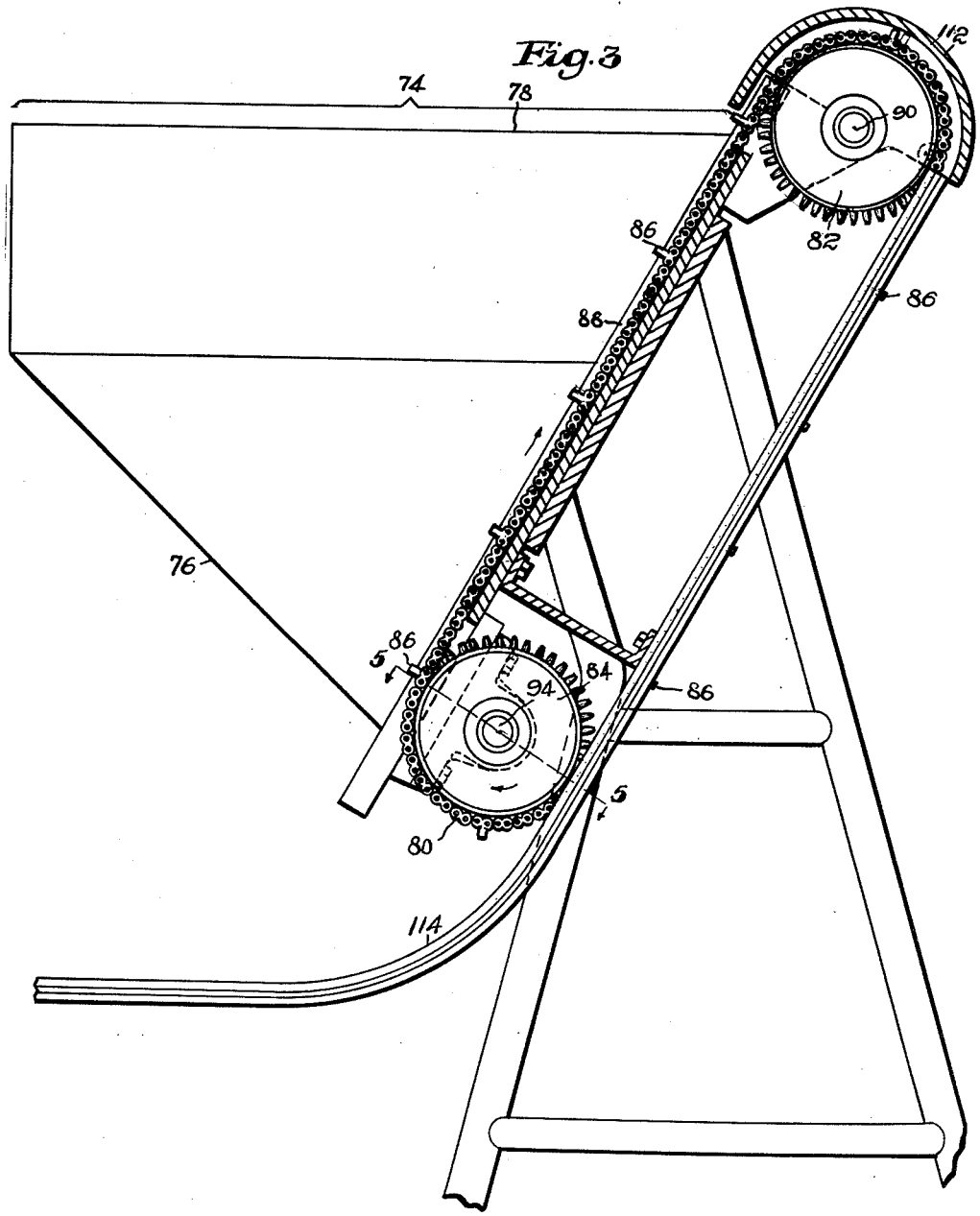
Inventor:
James P. Whelan
by Emery, Booth, Townsend, Miller & Neidner
Attys Feb. 3, 1953
J. P. WHELAN
2,627,104
MACHINE FOR PRODUCING COVERS AND OPENER LEVER ASSEMBLIES
Filed Feb. 20, 1947
17 Sheets-Sheet 6
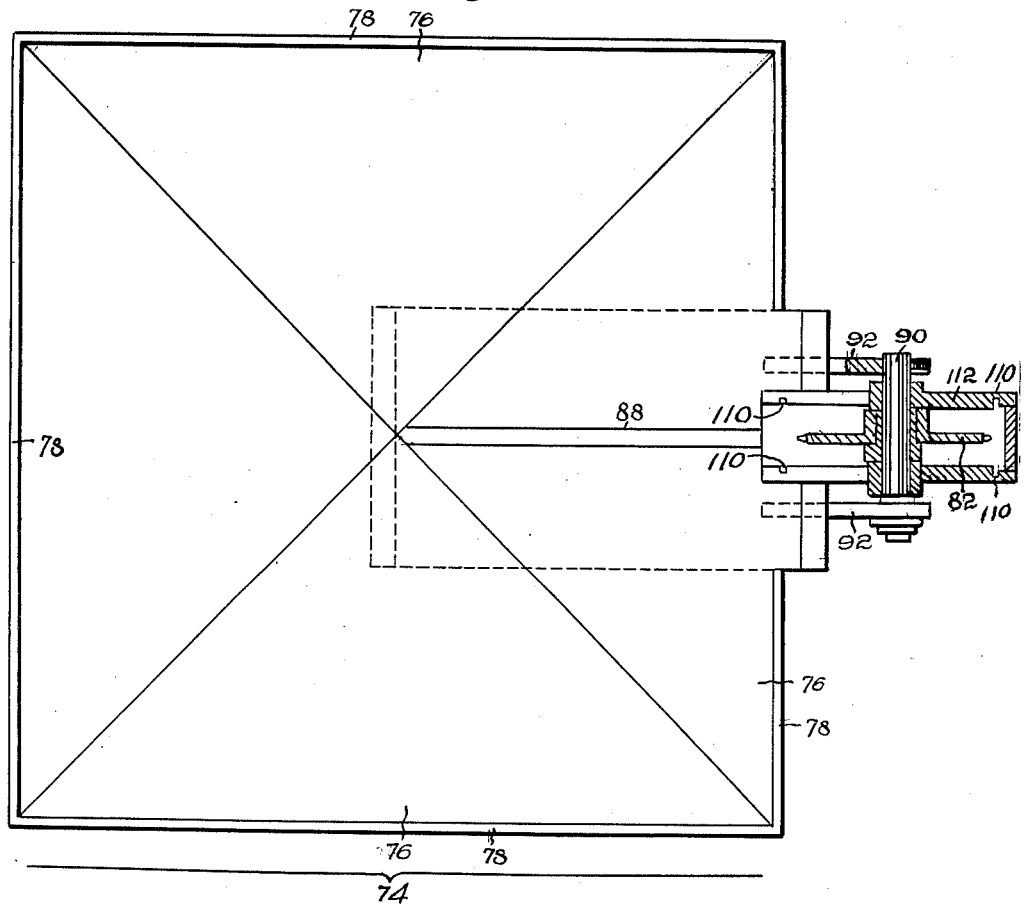
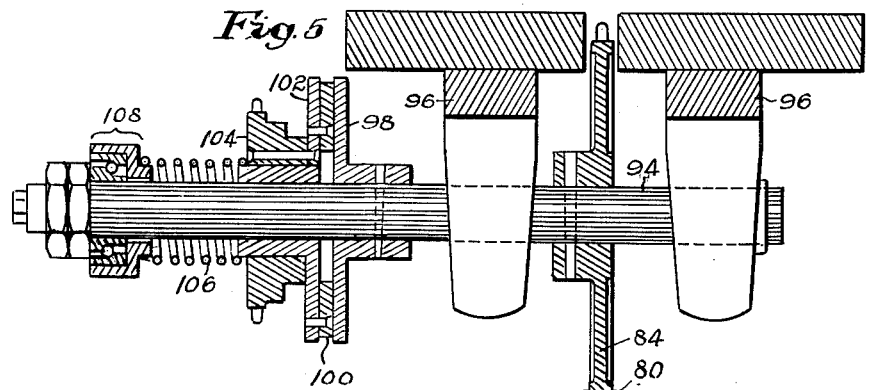
Inventor
James P. Whelan

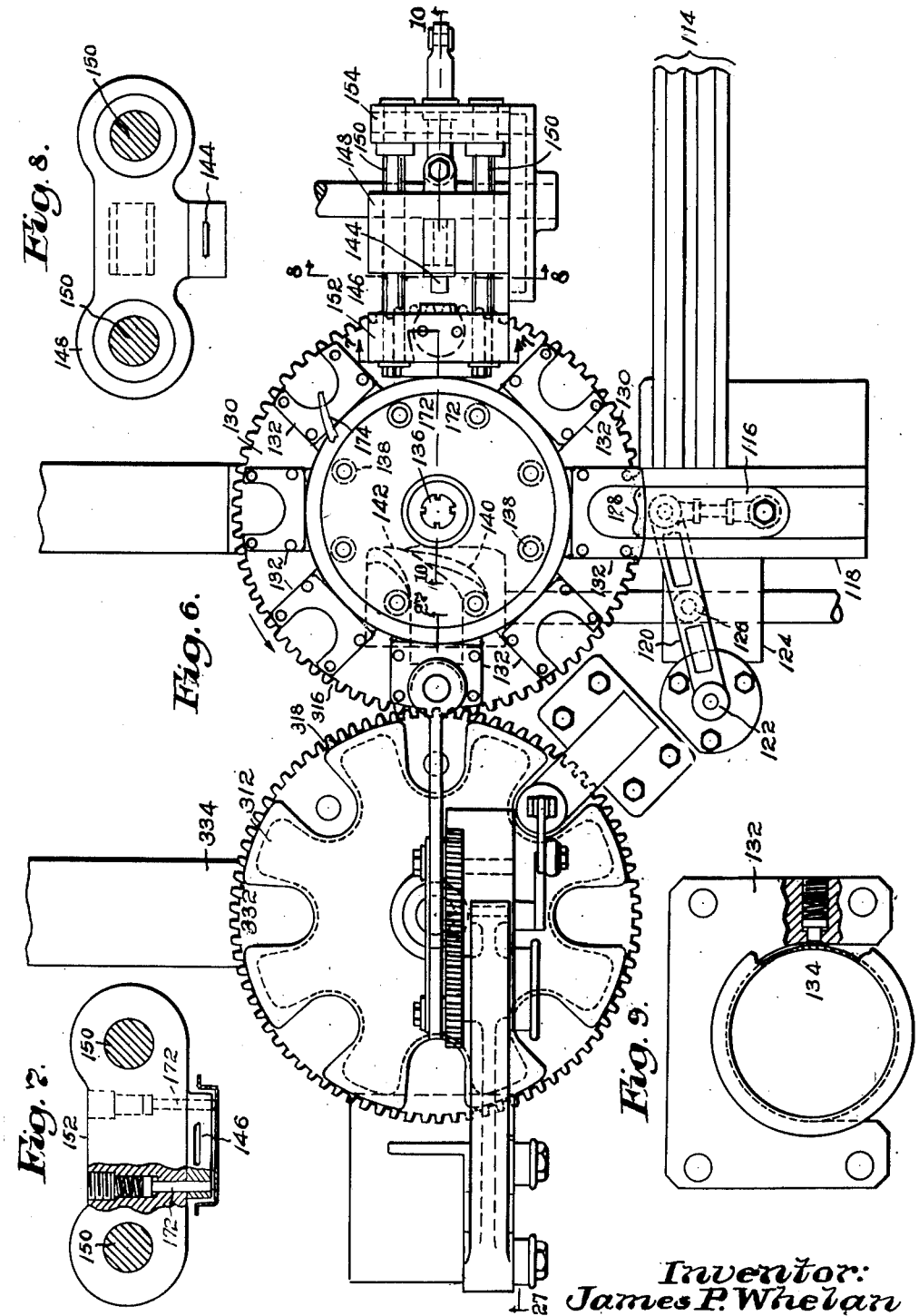

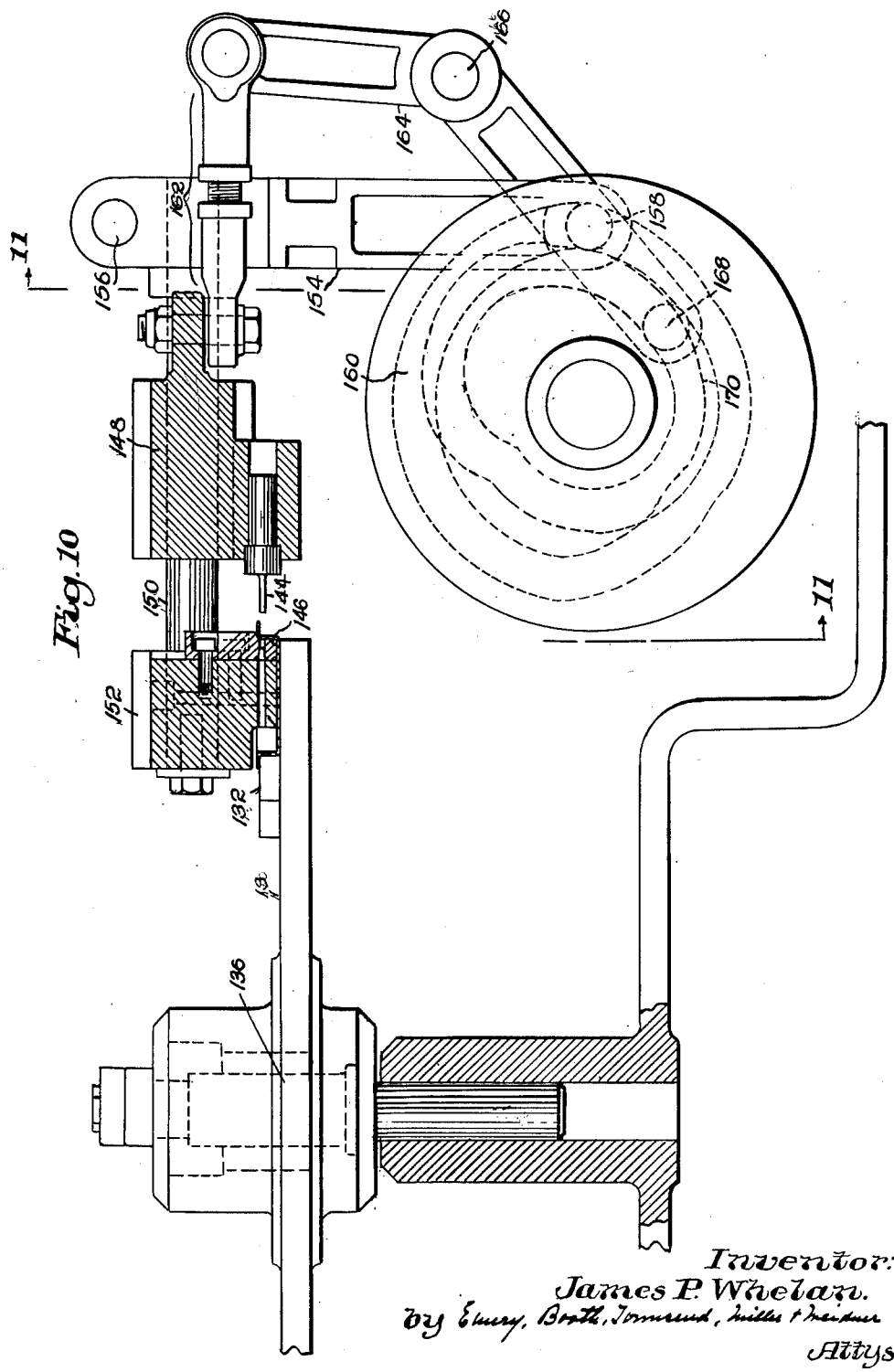

Feb. 3, 1953 J. P. WHELAN 2,627,104
MACHINE FOR PRODUCING COVERS AND OPENER LEVER ASSEMBLIES
Filed Feb. 20, 1947 17 Sheets-Sheet 9
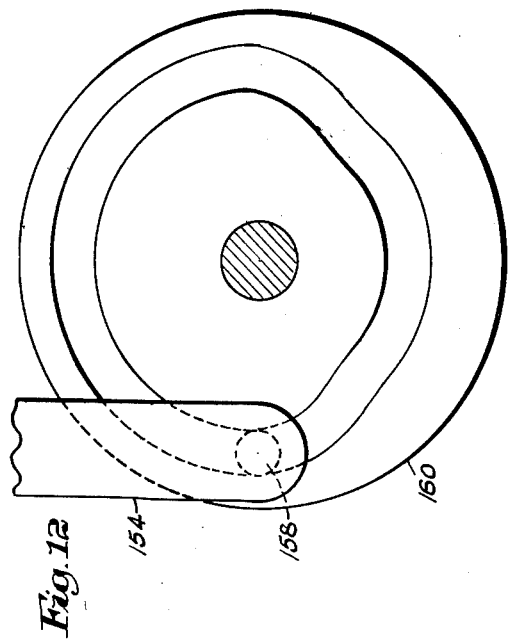
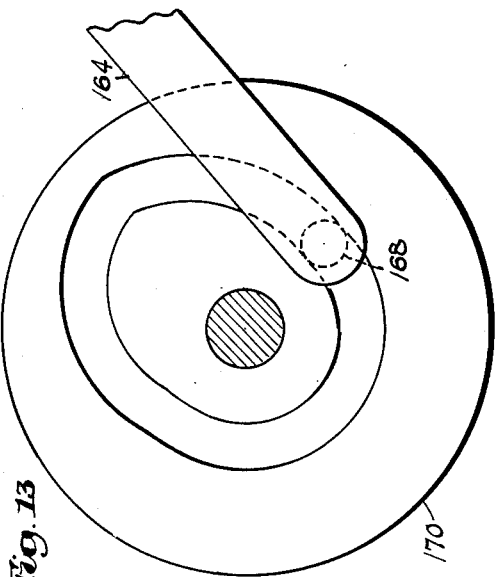
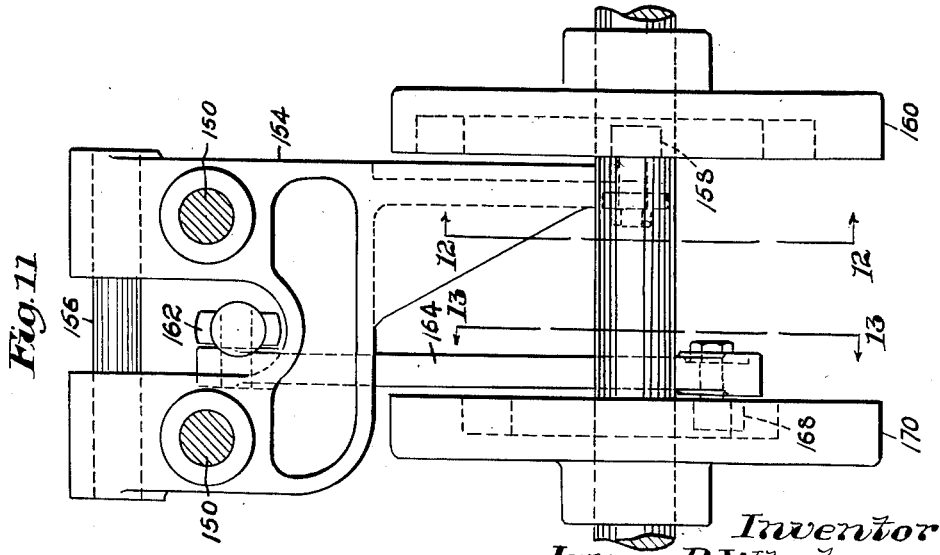
Inventor:
James P. Whelan,
by Emery, Booth, Townsend, Miller & Widner
Attys Feb. 3, 1953 J. P. WHELAN 2,627,104
MACHINE FOR PRODUCING COVERS AND OPENER LEVER ASSEMBLIES
Filed Feb. 20, 1947 17 Sheets-Sheet 10
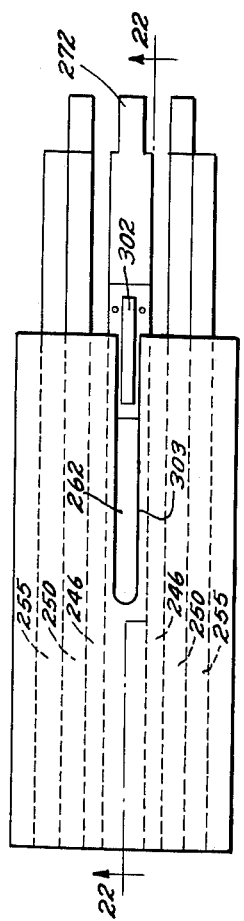
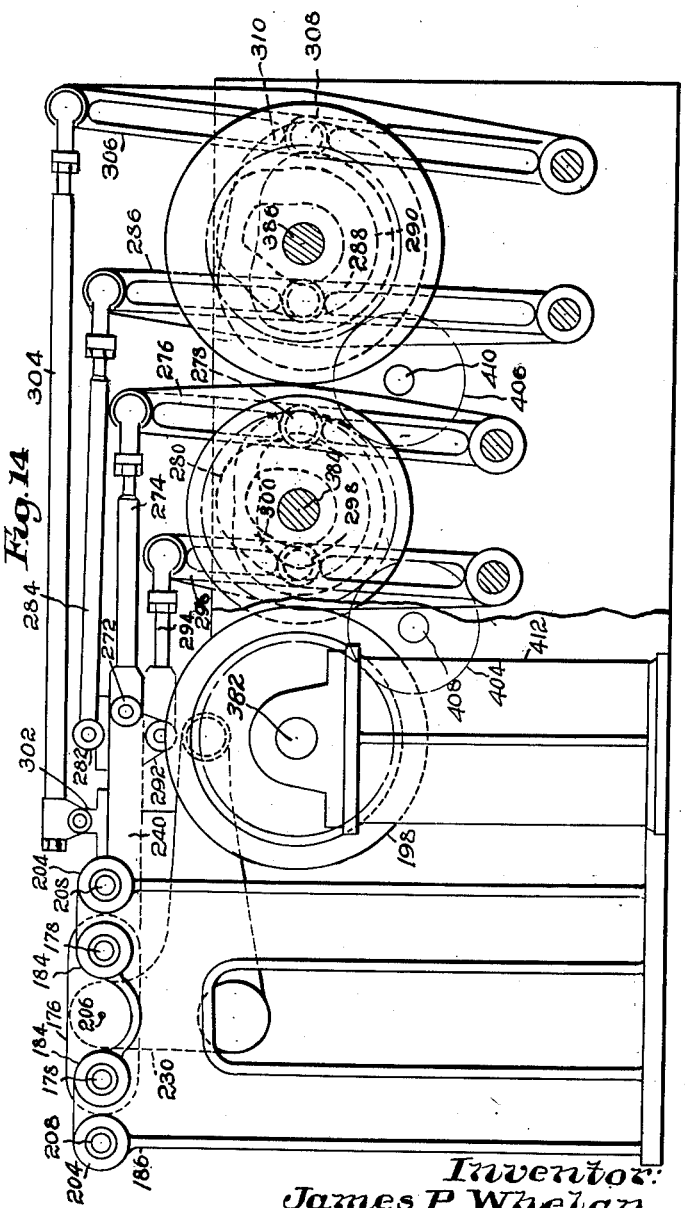
Inventor:
James P. Whelan
by Emery, Booth, Townsend, Miller & Neidner
Att'ys Feb. 3, 1953  J. P. WHELAN  2,627,104
MACHINE FOR PRODUCING COVERS AND OPENER LEVER ASSEMBLIES
Filed Feb. 20, 1947  17 Sheets-Sheet 11
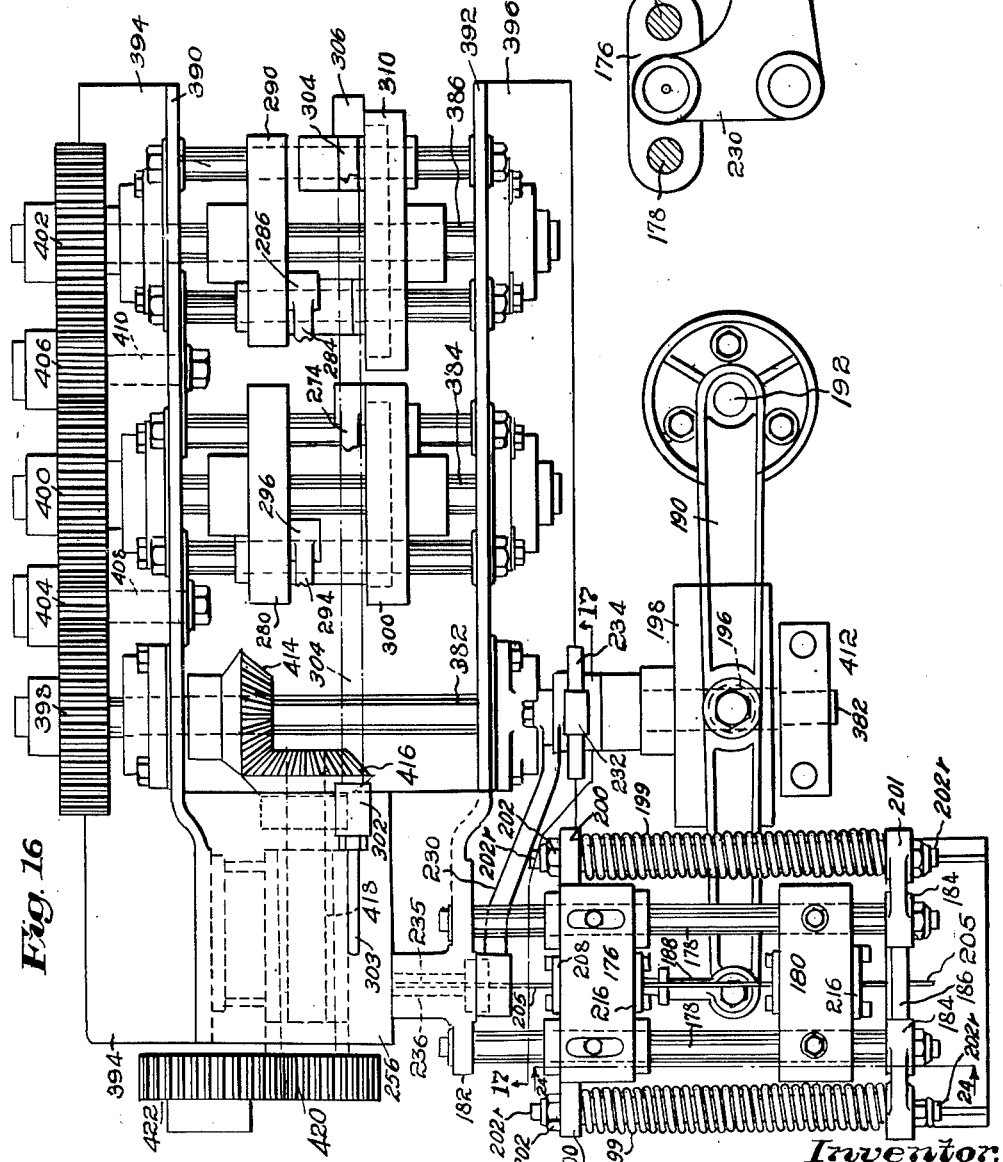
Inventor:
James P. Whelan
by Emery, Booth, Townsend, Miller & Maidmen
Attys Feb. 3, 1953 — J. P. WHELAN — 2,627,104
MACHINE FOR PRODUCING COVERS AND OPENER LEVER ASSEMBLIES
Filed Feb. 20, 1947 — 17 Sheets-Sheet 12
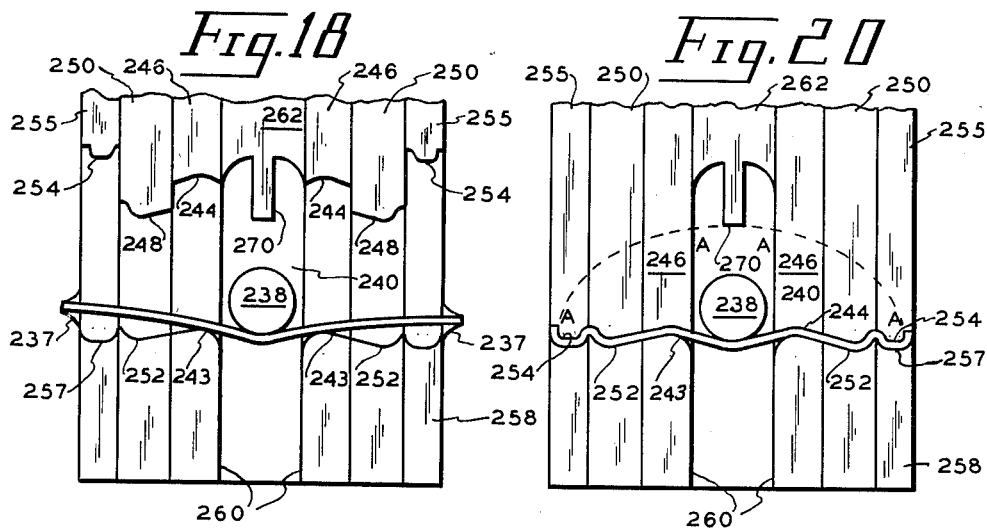
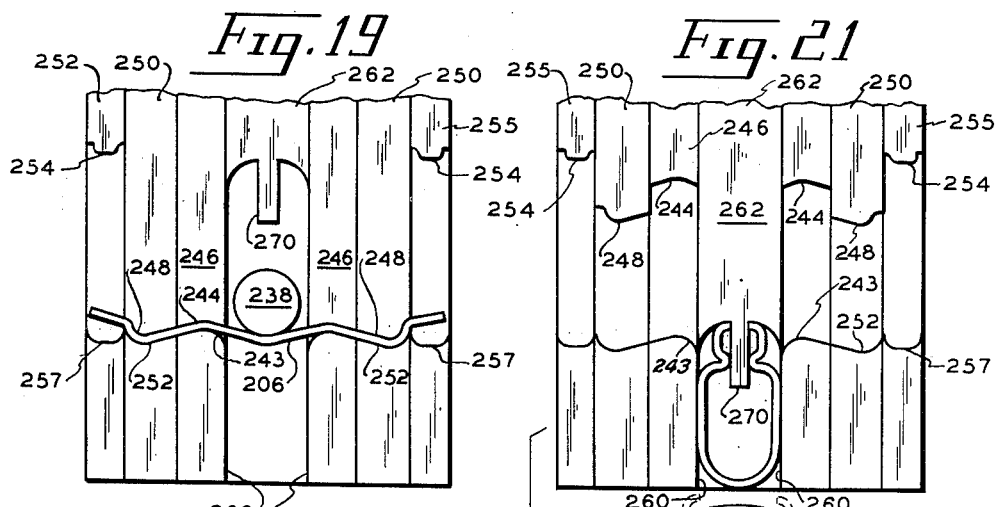
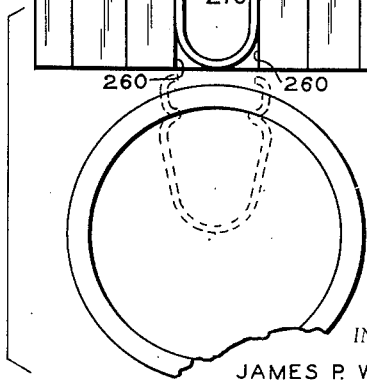
INVENTOR
JAMES P. WHELAN
BY Emery, Booth, Townsend, Miller & Weidner.
ATTORNEY Feb. 3, 1953 J. P. WHELAN 2,627,104
MACHINE FOR PRODUCING COVERS AND OPENER LEVER ASSEMBLIES
Filed Feb. 20, 1947 17 Sheets-Sheet 13
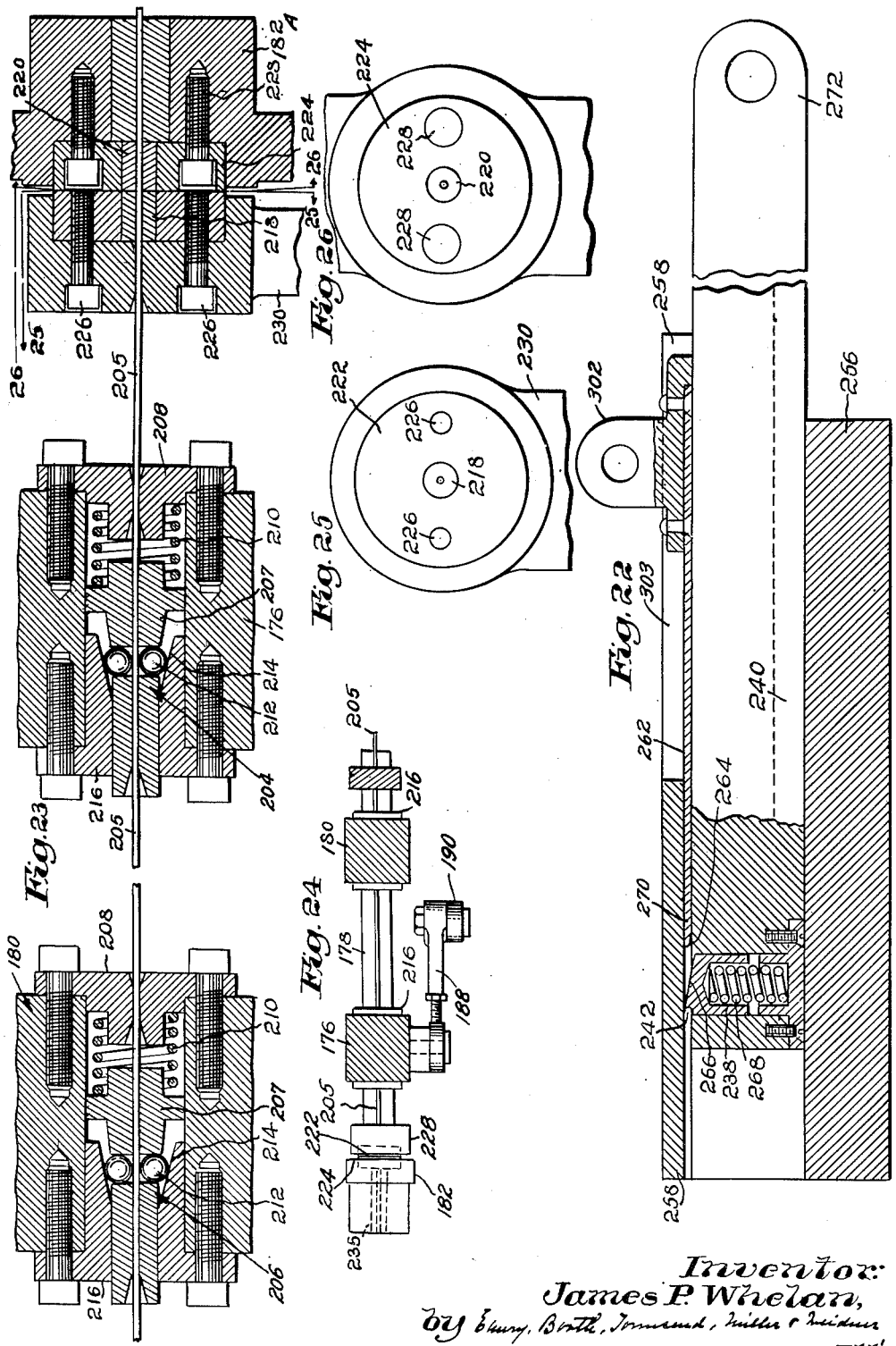
Inventor:
James P. Whelan,
Attys

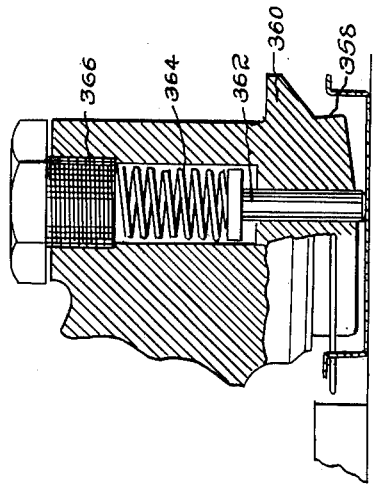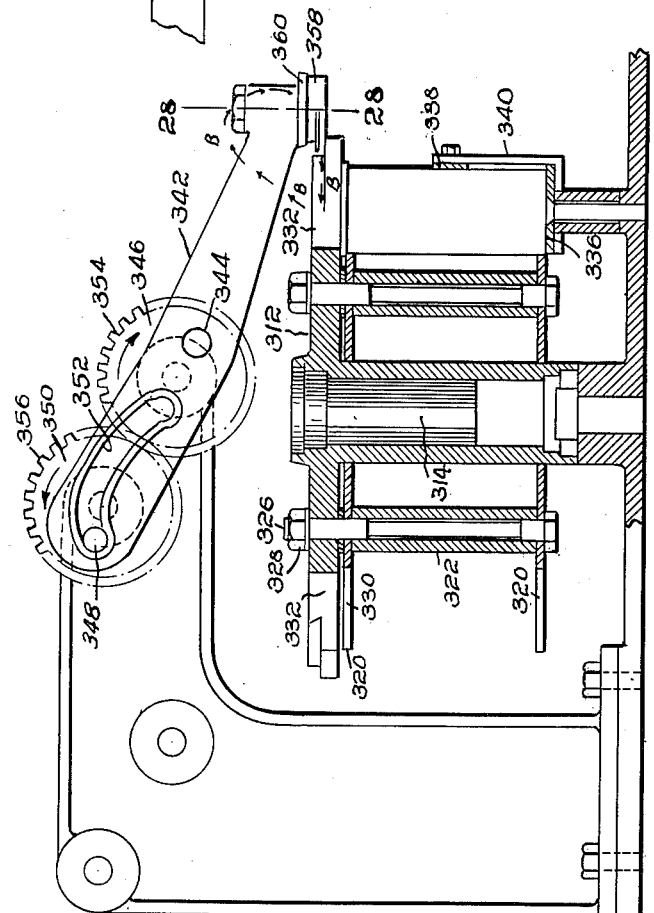

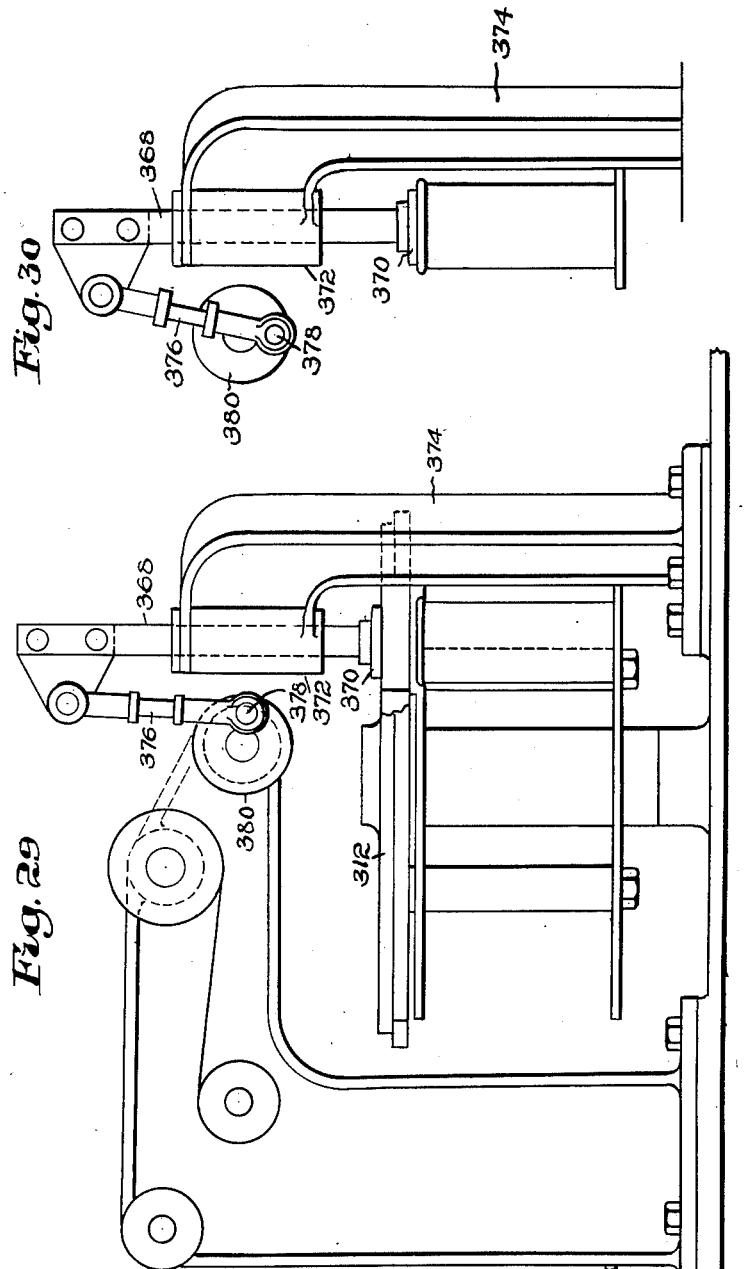

Feb. 3, 1953 J. P. WHELAN 2,627,104
MACHINE FOR PRODUCING COVERS AND OPENER LEVER ASSEMBLIES
Filed Feb. 20, 1947 17 Sheets-Sheet 16

Inventor:
James P. Whelan,
by Emery, Booth, Townsend, Miller & Heidner
Attys

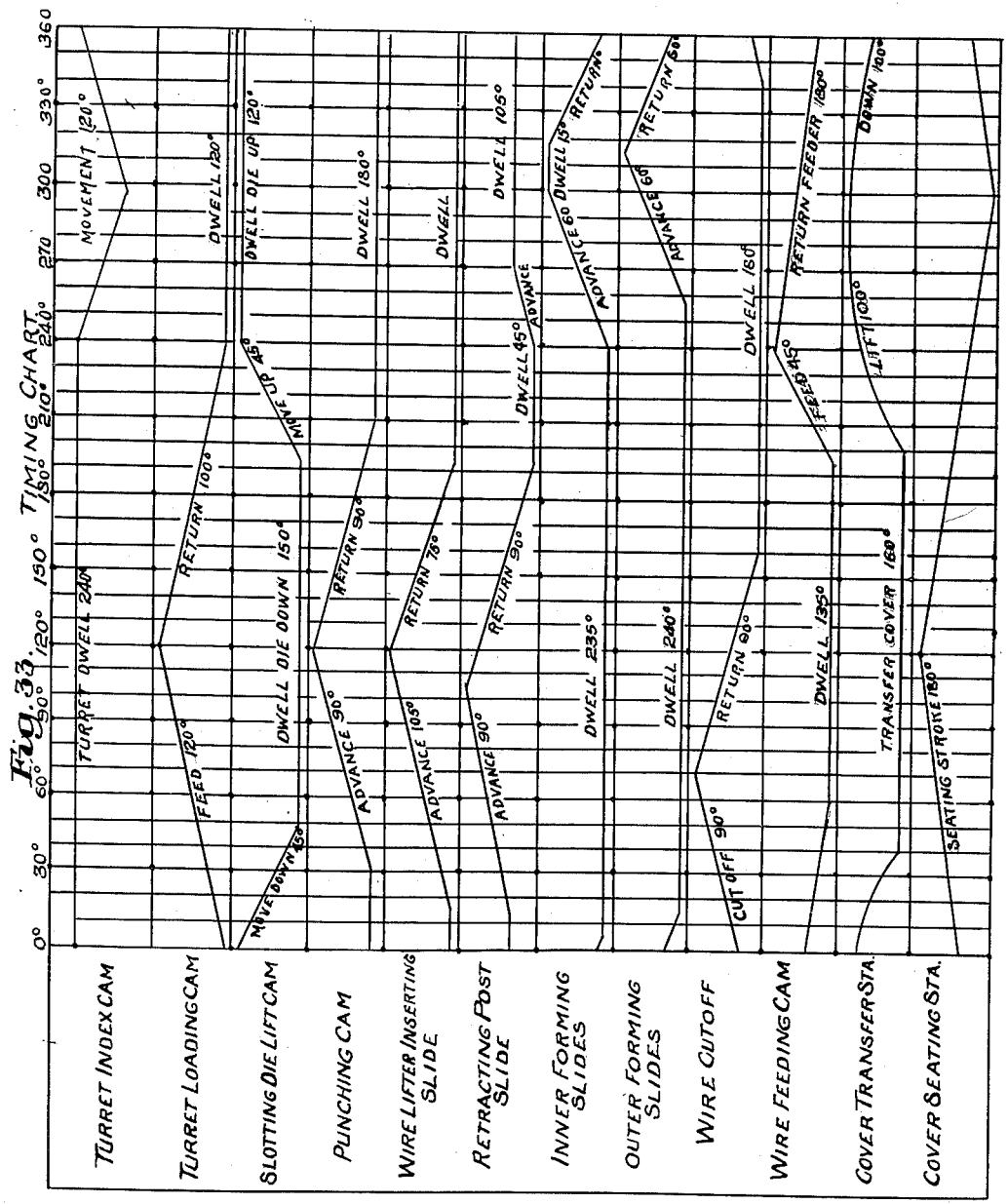

Patented Feb. 3, 1953

2,627,104

UNITED STATES PATENT OFFICE 2,627,104

MACHINE FOR PRODUCING COVERS AND OPENER LEVER ASSEMBLIES

James P. Whelan, Quincy, Mass., assignor, by mesne assignments, to Judson Dunaway Corporation, Dover, N. H., a corporation of New Hampshire Application February 20, 1947, Serial No. 729,897

5 Claims. (Cl. 29—33)

This invention relates to the art of and a machine for assembling receptacles, receptacle closures, and closure openers. The assembly of the closures with the openers involves also the forming of slots in the closures to receive the openers, and it further involves the actual making of the openers as well as their assembly with the closures. The art involves various steps to effect these results, and while they might be carried out wholly or largely by operations involving the use of the hands, the invention contemplates also a fully automatic machine to carry out the various steps, and possessing advantages of speed and economy, particularly as, with automatic stops to take care of possible faulty operations, one attendant can tend several machines.

The particular type of receptacle and closure with which the invention is concerned is a can provided with a friction-plug closure forced into the mouth of the can. There are circumstances under which it is desirable to remove the closure frequently to discharge some of the contents of the receptacle from time to time, and under such circumstances it is desirable to have the closure equipped with an opener in the form of a lever which remains attached to the closure and serves as a handle to hold the closure while pouring from the receptacle. The art and the preferred machine for carrying out the steps of the art are concerned with making the levers, forming slots in prefabricated closures, assembling the levers with the closures by inserting the levers in the slots, and finally assembling the closures with the receptacles.

The invention will best be understood by reference to the following description of the art or method including its various steps, followed by a description of one particular machine by which the steps may be carried out, while its scope will be pointed out more particularly in the appended claims.

The art involves starting with a disordered mass of closures, and, as a first step forming an orderly line of closures which are then guided to and loaded into successive holders on a carrier which carries the closures during subsequent steps involving the closures.

The carrier may be for example a turret rotated step-by-step to cause its holders to present a succession of closures at a succession of stations at which various steps are performed. There may be some intermediate stations at which no operations are performed.

Considering now the first work station at which a holder with its closure stops, the step which is performed at this station is the cutting of a slot through an annular wall of the closure. One way of cutting this slot is by the use of a punch and die placed in proper position after the carrier has stopped, and then operated to slot the closure and to recede to a non-operating position before the carrier starts again. Resumption of movement of the carrier brings the now slotted cover to a second work station where the closure is freed of the loose metal produced by the making of the slot. One convenient mode of removal is by the use of a jet of air.

Resumption of movement of the carrier brings the closure to a third work station where an opener in the form of a lever is inserted in the slot. It is convenient to use this second work station as the location for the operation of forming the lever, particularly as the conclusion of this operation conveniently inserts the completed lever into the slot in the closure. The operation of forming the lever involves steps including severing a wire to provide a piece of appropriate length which is then bent into generally U-shaped form with spring arms, provided with V-shaped notches, and terminal portions directed inwardly toward and aligned with each other. When the lever is inserted in the slot in the closure, these notches receive the ends of the slot and retain the lever in its place.

Resumption of movement of the carrier now brings the assembled closure and lever to a fourth work-station where the closure is assembled with the receptacle and the final assembly is released or extracted.

These various steps in the art will be explained more fully in connection with the following description of one particular machine shown in the accompanying drawings as an example, while the invention will be pointed out more particularly in the appended claims.

In the drawings:

Figs. 1A and 1B, taken together, constitute an elevation of a machine for carrying out the various steps;

Figs. 2A and 2B, taken together, constitute a plan of the machine, with the exception of the hopper and its associated mechanism for feeding closures from the hopper to the raceway.

Fig. 3 is a vertical sectional view showing the hopper, the raceway, and the closure feeding mechanism;

Fig. 4 is a plan, partly in horizontal section, showing the hopper, the raceway, and a portion of the closure feeding mechanism;

Fig. 5 is a sectional view, on an enlarged scale, on line 5—5 of Fig. 3, showing the lower portion of the closure feeding mechanism;

Fig. 6 is a plan of a portion of the machine, including the two turrets and associated mechanisms;

Fig. 7 is a vertical sectional view on line 7—7 of Fig. 6;

Fig. 8 is a vertical sectional view on line 8—8 of Fig. 6;

Fig. 9 is a plan, partly in horizontal section, showing one of the closure carriers of the first turret;

Fig. 10 is a vertical sectional view on line 10—10 of Fig. 6, showing the closure slotting mechanism;

Fig. 11 is a vertical sectional view on line 11—11 of Fig. 10, illustrating a portion of the closure slotting mechanism;

Fig. 12 is a vertical sectional view on line 12—12 of Fig. 11;

Fig. 13 is a vertical sectional view on line 13—13 of Fig. 11;

Fig. 14 is an elevation of the wire feeding, cutting, and forming mechanism;

Fig. 15 is a plan of a portion of the same;

Fig. 16 is a plan of the entire wire feeding, cutting and forming mechanism;

Fig. 17 is a vertical sectional view on line 17—17 of Fig. 16 illustrating the wire cutting mechanism;

Figure 31:
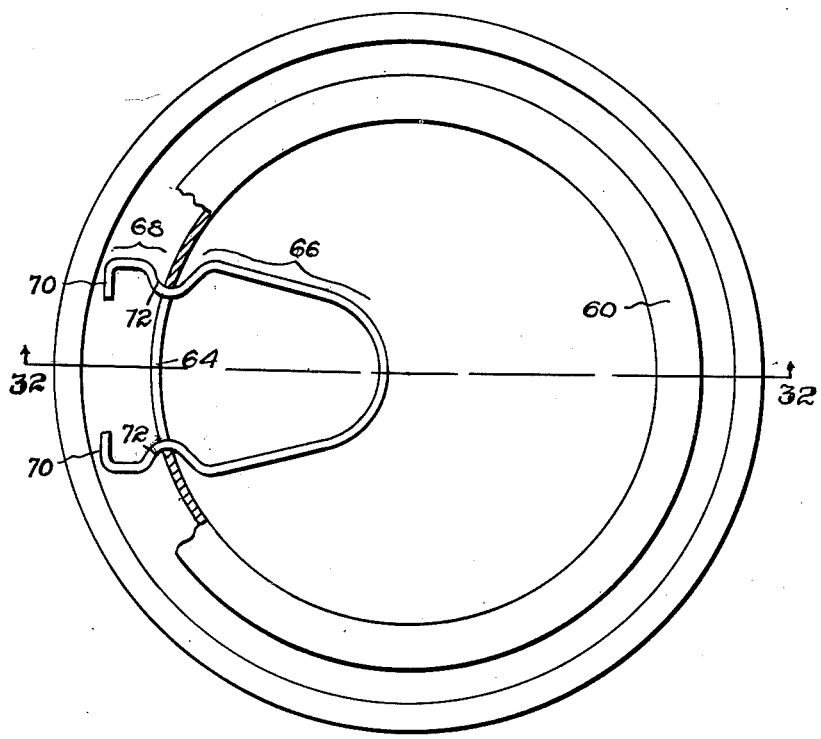
Figure 32:
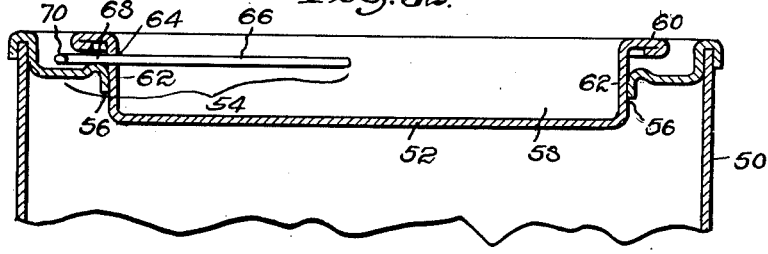

Figs. 18 to 21, inclusive, are plans of a portion of the wire forming mechanism, illustrating steps in the operation of the same;

Fig. 22 is a section approximately on line 22—22 of Fig. 15;

Fig. 23 is a horizontal sectional view of the wire feeding and cutting mechanism;

Fig. 24 is a longitudinal section taken approximately on line 24—24 of Fig. 16;

Fig. 25 is a sectional view on line 25—25 of Fig. 23;

Fig. 26 is a sectional view on line 26—26 of Fig. 23;

Fig. 27 is a vertical sectional view on line 27—27 of Fig. 6, illustrating the mechanism which transfers the closure assembly from the first turret to the second turret;

Fig. 28 is a vertical sectional view on line 28—28 of Fig. 27;

Fig. 29 is an elevation of the mechanism which seats the closure assembly in the receptacle;

Fig. 30 is an elevation of a portion of the same in its final position;

Fig. 31 is a plan, partly in horizontal section, showing the assembly of the receptacle, the closure, and the opener;

Fig. 32 is a vertical sectional view on line 32—32 of Fig. 31; and

Fig. 33 is a timing chart, showing the cycles of the various mechanisms.

In accordance with the preferred procedure, the invention contemplates various steps leading to a final assembly of a receptacle (see Figs. 31 and 32) such as a metallic can 50, a closure such as a plug-like metallic cover 52, and a closure opener such as a lever 54. The can has an opening 56 and the cover 52 has a depression 58 surrounded by an annular rim or lip 60 and by a slightly tapered, annular wall 62 which serves as a plug to close the opening 56. One step of the procedure is to provide this annular wall with a horizontal slot 64. Other steps are concerned with making the lever 54 having a handle portion 66 and a prying portion 68 conveniently made of half-hard, round wire having a resilient quality but nevertheless capable of being bent into the desired form, herein U-shaped, and having two resiliently related arms 70 which constantly tend to spring apart and thus to cause offset notches 72 in the arms to engage the ends of the slot 64.

The covers, prefabricated except for slotting, are introduced into a hopper 74 (see Fig. 4) in a disorganized mass. The first step in the procedure is to take covers from this mass (bottom side up) and to form them in an orderly line. One convenient way of accomplishing this step will now be described, reference being had at first to Fig. 4. To cause the covers to gravitate to the center of the hopper 74, the latter has the general form of a hollow inverted pyramid, herein four-sided (though it might be conical) formed by four sloping walls 76 which may be prolonged upwardly by the addition of four vertical walls 78.

One of the sloping walls 76 supports a mechanism, now to be described, which performs the first step of the procedure. A conveyor such as a chain 80 (see Fig. 3) carried by upper and lower sprocket wheels 82 and 84, travelling in the direction of the arrows, is equipped at intervals with special links having lugs 86 which project through a slot 88 in the adjacent wall 76 into the interior of the hopper 74 where, in travelling upward, they enter the depressions 58 of such covers 52 as happen to be presented with their depressions downward and in the paths of the lugs 86. In the present example, the upper sprocket wheel 82 is an idler on a shaft 90 in bearing brackets 92. The lower sprocket wheel 84 (see Fig. 5) is affixed to a driving shaft 94 turning in pillow blocks 96 and driven non-positively as by mechanism now to be described. A friction disk 98 affixed to the shaft 94 is contacted by a friction facing 100 on a disk 102 which is affixed to a driver 104 turning freely on the shaft. A spring 106, seated at one end against the driver 104 and at its other end against a thrust bearing, urges the friction facing 100 against the friction disk 98. When, therefore, the raceway, presently to be described, is completely occupied by covers, the friction drive will slip but will nevertheless furnish a yielding pressure tending to urge the covers along the raceway toward the outlet of the latter.

Near the top of the hopper (see Fig. 4) opposite sides of the lip 60 of the cover enter grooves 110 which begin in guide plates 112 and continue in a raceway 114 (see Fig. 3) which at first slopes downwardly parallel with the descending lead of the chain 80 and then gradually changes its direction until it finally becomes horizontal as shown at the bottom of Fig. 3. Thus, the covers are lifted from the hopper with their depressions presented downwardly, and as they pass over the upper sprocket wheel they are inverted, so that when they reach the horizontal portion of the raceway the depressions are uppermost in readiness for the steps which are to follow.

The covers are removed, one by one, from the exit of the raceway (see Fig. 6) by appropriate mechanism such as that now to be described. Transversely of the raceway exit, there is a slide 116 arranged to reciprocate horizontally in a guide 118 under the influence of a lever 120 swung to and fro on a pivot 122 by a cam 124 engaging a roller 126 on the lever. The slide 116 is shown in Fig. 6 in its fully advanced position in which it blocks the exit of the raceway 114. The length of the stroke of the slide is such that when the slide recedes its front end 128 passes beyond the raceway exit and thus admits a cover to the guide 118 in a position where the next forward stroke of the slide will advance the cover along the guide and deliver it to an appropriate carrier presently to be described, which receives successive covers from the slide and presents them at a succession of stations.

The carrier in the present example is an eight-position turret 130 having on its upper face a set of holders 132, herein eight, equally spaced angularly, and each equipped with a detent such as a spring-pressed, rounded pin 134 (see Fig. 9) which engages one side of the cover and keeps the same in place. Step-by-step rotation of the turret 130 about a fixed, upright shaft 136 is conveniently accomplished without shock by a harmonic motion mechanism which may be likened to intermittent worm gearing, comprising a set of rollers 138 (herein eight) successively engaged by a slot 140 of a cylindrical, grooved cam 142. The cam has a long dwell during which work is done on the cover, and has a short throw to produce partial rotation (45°) of the turret. Two such steps are required to carry a cover through 90°.

Actually, there are eight of these stations though some of them are mere idle positions. The first station may be termed the loading station because this is the position at which the loading slide 116 loads a cover into a holder 132 on the turret. The second station is idle. The third station is a work station where the slotting of the cover is accomplished by mechanism now to be described, reference being had to Fig. 10.

In the present example, the cover slotting mechanism comprises a punch 144 and a die 146, the latter being arranged to enter the depression in the cover prior to the punching operation and to leave the depression upon completion of the punching operation and before the turret starts to turn. To this end, the punch and die, as will presently appear, are parts of an assembly pivoted to rise and fall. The punch is in the nature of a thin, flat blade of the same cross-sectional shape and size as the slot to be produced in the cover. The front end of the punch is shaped to produce a shearing cut.

Figure 2B:
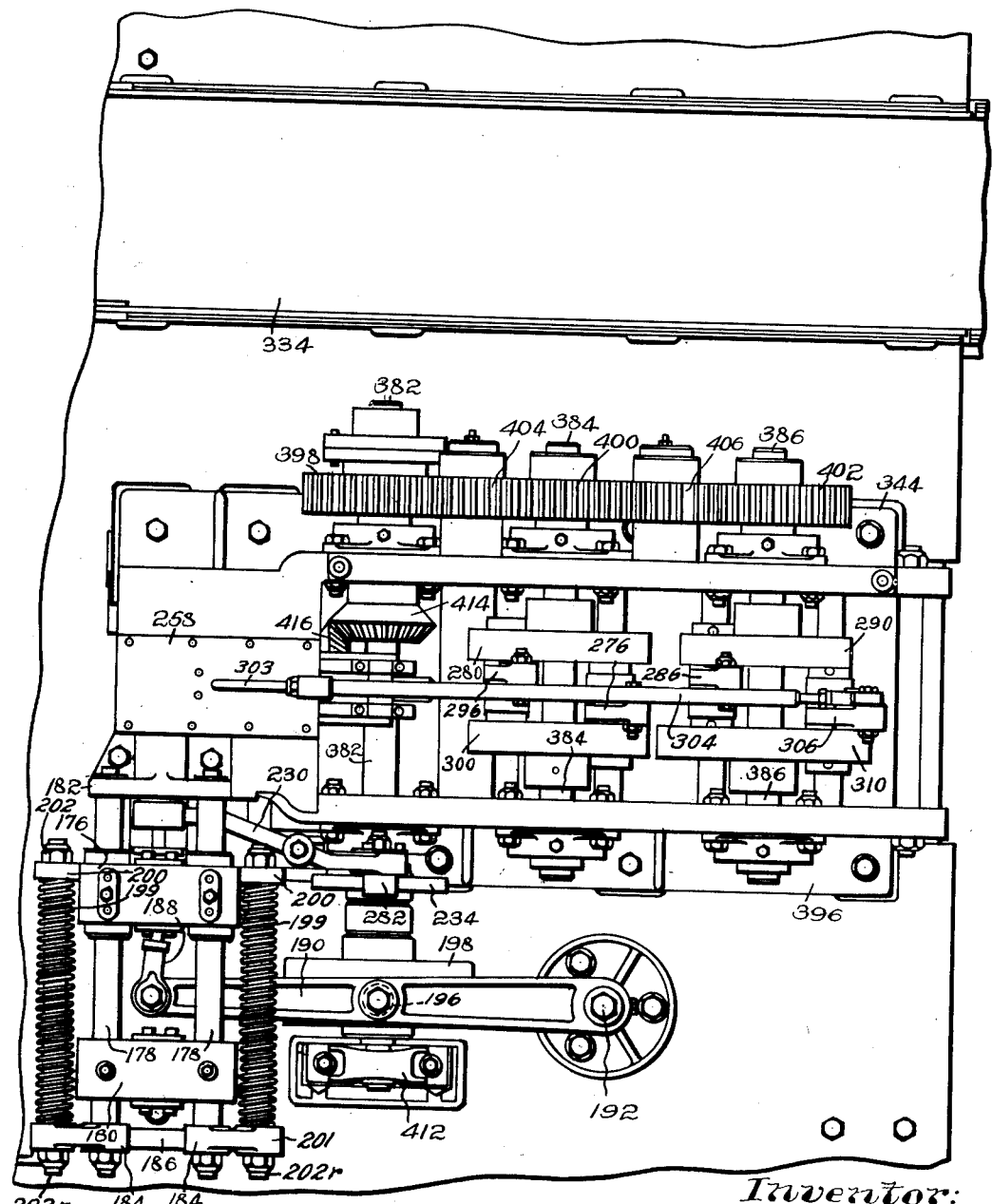

The punch (see Fig. 6) is mounted in and carried by a slide 148 guided by appropriate guides such as rods 150, while the die is mounted in a yoke 152 secured to one pair of ends of said rods. The rods are secured at their other ends to a rocking support 154 which (see Fig. 10) is rocked on a fulcrum 156 carried by frame members as seen at the lower portion of Fig. 2A by appropriate mechanism such as a roller 158 carried by the rocker and engaging a cam 160, and arranged to raise and lower the punch and die in properly timed relation to the turret movements. Reciprocation of the punch slide 148 is accomplished by suitable mechanism such as a lengthwise-adjustable link 162 connecting the slide to a lever 164 mounted on a fulcrum 166 on the same frame members and below 156 viewing Fig. 2A and carrying a roller 168 operated by a cam 170, to cause the punch to enter and leave the die and thus to punch the slot. After the slot has been punched, the punch and die recede upwardly, and as they rise, two vertical, spring-pressed plungers 172 (see Fig. 7) carried by the yoke 152 urge the cover downwardly into its place in the carrier 132 on the turret 130. After these plungers recede from the cover recess, the turret starts to rotate to carry the cover to a fourth station where a jet of compressed air released through a nozzle 174 (see Fig. 6) blows out of the cover recess the piece of waste metal resulting from the punching operation.

Further rotation of the turret brings the cover to a fifth station where a wire is severed to form a short piece which is then bent to form the described lever. The wire feeding and cut-off mechanism will now be described, reference being had at first to Fig. 2B. In the present example, the wire feeding is accomplished by two one-way wire clutches, one of which reciprocates and on its forward stroke advances the wire the required distance, upwardly viewing Figs. 2A and 16, to the right viewing Fig. 23 as indicated by the arrow, while the other is fixed and prevents backward movement of the wire. The first of these clutches (presently to be described) is carried by a slide 176 guided by guides such as rods 178, while the second is supported by a yoke 180 affixed to said rods. The rods are supported and held in fixed position by having their inner pair of ends secured to a suitable fixed support 182 and their outer pair of ends secured to ears 184 presented by a second fixed support 186. The slide 176 has a positive rearward movement and a non-positive forward movement under the influence of mechanism now to be described.

To produce the positive rearward movement the slide 176 is connected (Fig. 2B) by a link 188 to one end of a lever 190 pivoted at its other end on a fixed pivot 192 and at an intermediate point carrying a cam roller 196 resting against an open faced cam 198. This rearward movement takes place in opposition to the yielding resistance of a pair of springs 199 (see Figs. 2B and 16) whose forward ends rest against ears 200 on the slide 176, and whose rearward ends rest against ears 201 presented by the support 186. Forward movement of the slide 176 under the influence of the springs 199 is adjustably limited by nuts 202 threaded on the forward ends of rods 202r whose rearward ends are fixedly mounted in the ears 201.

The non-positive, forward movement of the slide 176 takes place under the influence of the springs 199, stressed by the open-faced cam 198, and suddenly released by an abrupt drop of the cam face acting like a trigger to propel the slide 176 forward with sufficient force to impart the necessary feeding stroke to the wire-feeding clutch presently to be described. However, if for any reason such as clogging of the wire, the slide 176 could not make its normal, forward stroke, the springs 199 will yield and prevent disaster to the mechanism.

The clutches will now be described, reference being had to Fig. 23. As already indicated, there is a wire feeding clutch 204 carried by slide 176 and a fixed, non-return clutch 206 carried by yoke 180, which are identical with the exception of the fact that one reciprocates and the other is fixed as hereinbefore explained. As the clutches are alike, a description of one will suffice for the other and corresponding parts will be given like reference characters.

A wire 205, leading from a suitable source of supply, passes through a slidable sleeve 207 and a fixed sleeve 208 between which there is a spring 210 tending to move the slidable sleeve rearwardly. The slidable sleeve 207 carries a set of balls 212 which contact the wire 205 as well as an internal, tapered surface 214 presented by a fixed bushing 216. During the forward travel of the wire-feeding slide 176, to the right in Fig. 23, the balls carried by the wire feeding clutch grip the wire and carry it forward, the forward motion being unresisted by the balls of the fixed, non-return clutch 206 at the left of the figure. When on the other hand, the wire-feeding slide moves rearwardly, the balls carried by the wire feeding clutch 204 at the center of the figure back away from the tapered surface 214 and travel idly, rearwardly along the wire. Meanwhile, any tendency of the wire to travel rearwardly is resisted by the balls of the fixed, non-return clutch, which engage the tapered surface 214 of that clutch.

As the wire is fed forward, it passes through two bushings 218 and 220, which abut end to end, and are made of suitable hard material such as "Carboloy" so that by moving the bushing 218 laterally a sufficient distance the wire is severed in a plane containing the abutting end faces of the bushings, the margins of the holes of the bushings serving as cutting edge. While wear of the bushings is slight, it may be compensated for by adjusting either or both of them, herein both, about the axis of the wire. This is conveniently accomplished by mounting the bushings 218 and 220 in disks 222 and 224 rotatable about the axis of the wire and normally held in fixed position by screws 226 and 228. The disk 222 is mounted on a lever 230, and the disk 224 is mounted in the fixed part 182 of the frame. Movement of the lever 230 laterally, i. e., transversely of the wire to sever the latter is conveniently accomplished by rocking the lever (see Fig. 17) by a cam roll 232 on the lever and engaging a cam 234.

The short length 235 of wire (about three inches in practice) thus cut off will be pushed forward through a guide 236 a distance equal to its own length by engagement of its rear end with the front end of the wire 205 during the next feeding movement. When the wire 205 is again severed, thus forming a second short length 235, this pushes the first short length forward a distance equal to its own length into position to be operated upon by the wire bending instrumentalities now to be described, reference being had to Figs. 18 to 22, inclusive.

For the sake of brevity, the short length of wire 235 now to be operated upon will be referred to simply as the wire. The bending instrumentalities comprise in a general way several slides across whose ends the wire is now in place in readiness for the first operation which is to bend the wire slightly, like a bow, by exerting a pressure upon its center and to give it the preliminary form shown in Fig. 18.

As shown in Fig. 18, the ends of the wire rest in pockets 237 with flared, rounded outer ends presenting no resistance to the forming operation which is to follow. A post 238, herein cylindrical, carried by a centrally disposed post slide 240 has a cylindrical surface, provided with a shallow groove 242 tangent to the wire. By advancing the slide 240 a short distance, the post 238 pushes the center of the wire forward into the form shown in Fig. 18 and then rests. This operation brings the wire at two points against two nodes 243 presented at the front ends of depressions 244 in fixed bars 246 at opposite sides of and contiguous to the slide 240.

The next forming operation is illustrated in Fig. 19 and is accomplished by irregularly shaped surfaces 248 at the front ends of a pair of inner forming slides 250 which now advance and form the wire by bringing it against two fixed surfaces 252 having a form corresponding to the form of the surfaces 248 and parallel therewith when the surfaces 248 are fully advanced.

The next forming operation is illustrated in Fig. 20 and is accomplished by surfaces 254 on the front ends of a pair of outer forming slides 255 which now advance and form the wire by bringing it against two fixed surfaces 257 having a form corresponding to the form of the surfaces 254 and parallel therewith when the surfaces 254 are fully advanced. This mechanism is enclosed in a housing 256 having a cover plate 258 and the fixed surfaces 252 and 257 are conveniently formed as projections from the inner face of this cover plate.

The next forming operation is illustrated in Fig. 21 and is accomplished after retraction of the slides 250 and 255 by moving the post 238 radially inward, or downwardly viewing Fig. 20, thus causing the ends of the wire to approach each other from the position of Fig. 20 along the dotted arcs A—A until finally a U-shaped form is developed between parallel confronting surfaces 260. The wire is now completely formed and ready for insertion in the slot of a cover. This is accomplished by a post-repressing slide 262 (see Fig. 22) which now advances. This slide has a rounded or bevelled surface 264 which rides upon a bevelled surface 266 on the adjacent end of the post 238, and causes retraction of the latter in opposition to a spring 268 which tends to thrust the post against the cover plate 258. The slide 262 then rides completely over the now repressed post 238 and it has a narrow tongue 270 (see Fig. 18) which enters the space between the ends of the wire and pushes the now completed lever into place in the cover, the resilient arms of the lever now springing apart (see Fig. 31) and engaging the ends of the slot in the cover.

The mechanism for actuating the slides will now be described reference being had at first to Fig. 14. The post carrying slide 240 has at its rear end an ear 272 connected by a link 274 to a lever 276 carrying a cam roll 278 operated by a cam 280, thus reciprocating the slide 240. The inner, wire-forming slides 250, which are connected together and operate as one, are provided with a pair of ears 282 connected by a link 284 to a lever 286 carrying a cam roll 288 operated by a cam 290. The outer, wire-forming slides 255, which are connected together and operate as one, are provided with a pair of ears 292 connected by a link 294 to a lever 296 carrying a cam roll 298 operated by a cam 300. The post-retracting and lever-inserting slide 262 is provided with an ear 302 operating in a slot 303 in cover 258 connected by a link 304 to a lever 306 carrying a cam roll 308 operated by a cam 310. The timing of the wire-feeding, wire-cutting, wire-forming, and other mechanisms is shown by a time chart (see Fig. 33) which gives the entire cycles.

After the completion of the lever and the insertion of the same in the cover, the turret 130 (see Fig. 6) carries this sub-assembly past an idle station and brings it to the seventh station where the sub-assembly is transferred to another carrier such as a second turret 312 where the sub-assembly is at first loosely assembled with a can by placing the cover upon the can. The mechanism for accomplishing this transfer is illustrated in Fig. 27.

The turret 312 turns on a shaft 314 and is conveniently driven by the first turret 130, as by gearing the turrets directly together by spur gears 316 and 318 (see Fig. 6) meshing with each other. It follows that the second turret will be correctly timed with relation to the first turret. The second turret 312 (see Fig. 27) carries on its lower face upper and lower can feeding disks 320 attached to each other and to the turret as by sleeves 322, cap-screws 324 and studs 326 with nuts 328. These disks are provided with notches 330 and the turret 312 is provided with similar notches 332 (see Fig. 6) and the notches receive cans from a conveyor belt 334. The turret 312 travels clockwise as viewed in Fig. 6. Returning now to Fig. 27, as the cans leave the conveyor belt 334 they are supported by a track 336 and they are restrained laterally by a wall 338 supported by brackets 340.

The mechanism for transferring the covers from the carriers 132 on the first turret 130 to the notches 332 in the second turret 312 will now be described, reference being had to Fig. 27. This mechanism may be likened to a hand which reaches out and simply drags a cover from the first turret to the second turret where it will merely rest loosely within the mouth of a can. A later operation of another mechanism will press the cover into place in the can.

The cover transfer mechanism comprises an arm 342 to which a gyratory motion is imparted by appropriate mechanism such as a crank pin 344 carried by a rotating crank disk 346, and a cam roll 348 carried by a rotating disk 350 and working in an irregular cam slot 352 in the arm 342. The disks are connected together by spur gears 354 and 356. By the gyratory motion furnished by this mechanism, the forward end of the arm 342 is caused to travel from the position shown in Fig. 27 horizontally toward the left (radially inward with respect to the second turret) and thence by a curved path to the point of beginning, the path being indicated by the arrows B, B. The arm 342 carries at its outer end a disk 358 to enter the depression in the cover and provided with a flange 360 to engage the side wall of the cover. When the disk descends into the cover, the latter is pressed downwardly by yielding pressure furnished by pins 362 (see Fig. 28) extending through the disk 358 and engaging springs 364 whose upper ends rest against abutments such as threaded plugs 366. When the cover is brought into registration with the can opening, this spring pressure keeps the cover in place as the arm 342 rises and withdraws the disk 358 from the can cover.

The next step is to seat the cover firmly in the can. This operation will now be described, reference being had to Fig. 29. A vertical plunger 368 aligned with the can at the cover seating station and provided with a disk 370 to enter the recess in the cover, is arranged to slide vertically in a guide 372 presented by a bracket 374. The plunger is reciprocated vertically by suitable mechanism such as a link 376 connected to a crank pin 378 carried by a crank disk 380. When the turret is in fixed position with a can beneath the plunger, the latter descends (see Fig. 30), presses the cover firmly in place in the can, and then ascends.

The final assembly is now complete and nothing remains to be done but to discharge the now complete assembly at a discharge station. This is conveniently accomplished by the simple discontinuance of the can supporting track 336 just before the discharge station is reached. The can is then free to gravitate upon the conveyor belt 334, a portion of which is depressed below the second turret. This completes the sequence of steps.

The various mechanisms hereinbefore described (except the hopper mechanism which is independently driven) are connected together and driven in properly timed relationship by suitable driving mechanism such as that now to be described, reference being had at first to Fig. 14.

There are three parallel shafts 382, 384 and 386 turning in suitable bearings affixed to parallel vertical walls 390 and 392 presented by brackets 394 and 396 constituting parts of the frame of the machine. These three shafts are connected by a train of spur gearing comprising spur gears 398, 400 and 402 affixed to the shafts 382, 384 and 386, respectively. These three gears are connected by two spur idler gears 404 and 406 which turn on studs 408 and 410 affixed to the adjacent wall 390 of the bracket 394. Power may be applied at any convenient point, but preferably to the shaft 382. The shaft 382 is prolonged beyond the wall 392 of the bracket 396 and is further supported in a suitable bearing in a bracket 412.

To the first shaft 382 the wire feeding cam 198 and the wire cutting cam 234 are secured. To the second shaft 384 there is secured the cam 280 which reciprocates the outer, wire-forming slides 256. To the third shaft 386 there are secured the cam 290 which reciprocates the inner, wire-forming slides 258, and the cam 310 which reciprocates the post-retracting and lever-inserting slide 262. The first shaft 382 is driven by another train of gearing, including a miter gear 414 meshing with and driven by a like miter gear 416 affixed to a shaft 418 which turns in a suitable bearing affixed to the bracket 394. To the shaft 418 there is affixed a spur gear 420 which meshes with and drives a spur gear 422. The latter, as will presently appear, drives a shaft 424 to which the turret loading and turret indexing cams are secured.

Figure 1B:
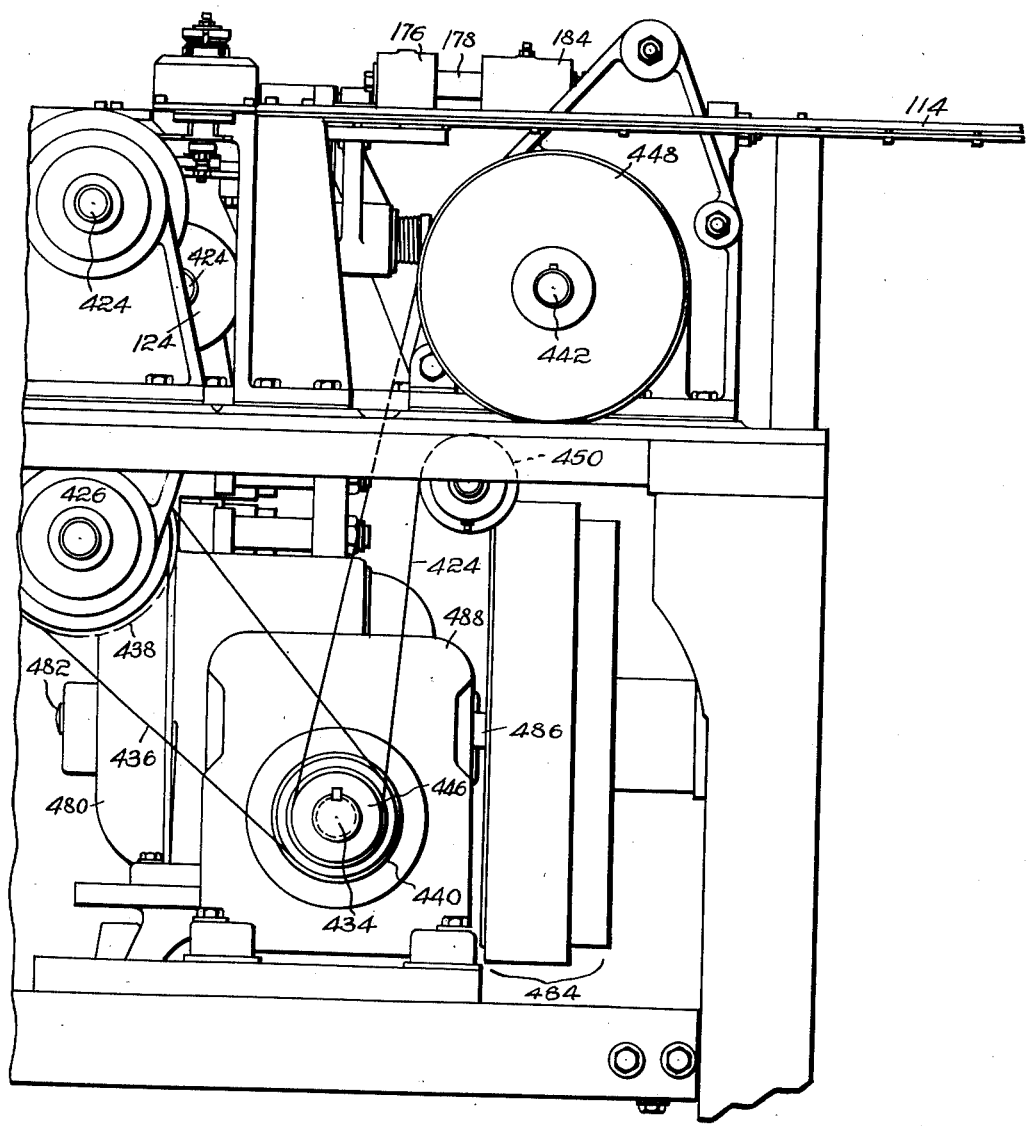

The shaft 424 (see Fig. 1A) is driven from a countershaft 426 by appropriate mechanism such as a gear train including a gear 428 affixed to the shaft and meshing with an idle gear 430 which, in turn, meshes with a gear 432 affixed to the countershaft 426. The countershaft is driven from a main shaft 434 (see Fig. 1B) by appropriate mechanism such as a chain 436 connecting a sprocket wheel 438 on the countershaft 426 to a sprocket wheel 440 on the main shaft 434.

A cam-shaft 442 (which carries the cams 168 and 170 of the cover slotting mechanism) is driven from the main shaft 434 by suitable mechanism such as a chain 444 connecting a sprocket wheel 446 on the main shaft to a sprocket wheel 448 on the cam-shaft. An idle sprocket wheel 450 deflects one lead of the chain.

Referring again to Fig. 1A, the cover-transferring and cover-seating mechanism (upper left) the spur gear 356 meshes with and is driven by a smaller spur gear 452 on a shaft 454 on which there is a sprocket wheel 456 driven by a chain 458 passing over idle sprockets 460 and 462 and a sprocket wheel 464 affixed to a shaft 466 of a commercial speed-reducer 468 having a shaft 470 which drives a drum 472. This drum is the driver for the conveyor belt 334, and the speed reducer 468 has a reducing ratio about four to one to rotate the drum at the necessary slow speed. The shaft 466 of the speed-reducer is driven from the countershaft 426 by appropriate mechanism such as a chain 474 connecting a sprocket wheel 476 on the shaft 466 to a sprocket wheel 478 on the countershaft 426.

Returning now to Fig. 1B, the main shaft 434 receives power from a suitable source such as an electric motor 480 having a shaft 482 suitably connected to the main shaft 434 as by a commercial Reeves No. 33 pulley 484, a shaft 486, and a commercial speed-reducing worm gear set 488 of which the main shaft 434 is a part.

Having thus described the steps of the method and the preferred machine for carrying out those steps, what I claim is:

1. A machine for producing a cup-shaped and flanged cover having an opener lever extending through the wall of the cup body closely beneath the flange comprising an intermittently movable conveyor having pockets with an open side into which the covers may be placed with a side exposed, a punching mechanism adjacent the path of the cover opposite to which the pockets successively come, and comprising a die and means for temporarily lowering it into a cup on the conveyor behind the wall thereof and also comprising a punch and means for driving it through the wall into the die to slot the wall, a strip or wire material holding and forming assembly opposite a later position of the pocket, said assembly including a central guideway and laterally spaced sets of cooperating dies for successively operating upon the material to form the details of opener lever legs, means for disposing an elongated metal strip or wire material across said shaping members and spanning said guideway, a plunger member adjacent said strip position and traverse to said guideway, means to move the plunger in the direction of the guideway to urge a portion of the strip into said guideway, means for retracting said plunger transversely of the guideway, and means including a reciprocating member for engaging said strip upon retraction of said plunger and the operation of the shaping dies to force the same through said guideway to form a generally U-shaped lever and to insert it into said cover-slot.

2. The structure of claim 1 characterized in that the plunger member is provided at its outer marginal edge portion with a groove tangent to the material to engage the material during movement of the plunger in the direction of the guideway.

3. The structure of claim 1 characterized in that the walls of the central guideway provide a stop for limiting the outward movement of the plunger.

4. A machine for producing a cup-shaped and flanged cover having an opener lever extending through the wall of the cup body closely beneath the flange comprising an intermittently movable conveyor having pockets with an open side into which the covers may be placed with a side exposed, a punching mechanism adjacent the path of the cover opposite to which the pockets successively come and comprising a die and means for temporarily lowering it into a cup on the conveyor behind the wall thereof and also comprising a punch and means for driving it through the wall into the die to slot the wall, a strip or wire material holding and forming assembly opposite a later position of the pocket, said assembly including a central guideway and laterally spaced sets of cooperating dies for successively operating upon the material to form the details of opener lever legs, means for disposing an elongated metal strip or wire material across said shaping members and spanning said guideway, a plunger member adjacent said strip position and transverse to said guideway, means normally urging said plunger member outwardly above the material spanning said guideway, said plunger member including an upward tapered face portion, means to move said plunger in the direction of the guideway to urge a portion of the strip into said guideway, and a reciprocating member for engaging the tapered face of said plunger to move said plunger in the direction of its axis and inwardly of the material spanning said guideway, said reciprocating member after inward movement of said plunger engaging said strip to force the same through said guideway to form a generally U-shaped lever and to insert it into said cover slot.

5. A machine for producing a cup-shaped and flanged cover having an opener lever extending through the wall of the cup body closely beneath the flange comprising an intermittently movable conveyor having pockets with an open side into which the covers may be placed with a side exposed, a punching mechanism adjacent the path of the cover opposite to which the pockets successively come and comprising a die and means for temporarily lowering it into a cup on the conveyor behind the wall thereof and also comprising a punch and means for driving it through the wall into the die to slot the wall, a strip or wire material holding and forming assembly opposite a later position of the pocket, said assembly including a central guideway and laterally spaced sets of cooperating dies for successively operating upon the material to form the details of opener lever legs, means for disposing an elongated metal strip or wire material across said shaping members and spanning said guideway, a plunger member adjacent said strip position and transverse to said guideway, spring means normally urging said plunger member outwardly above the material spanning said guideway, said plunger member including an upward tapered face portion, means to move said plunger in the direction of the guideway to urge a portion of the strip into said guideway, and a reciprocating member having a tapered face for engaging the tapered face of the plunger to move said plunger in the direction of its axis and inwardly of the material spanning the guideway.

JAMES P. WHELAN.

REFERENCES CITED

The following references are of record in the file of this patent:

UNITED STATES PATENTS

| Number | Name | Date |
|---|---|---|
| 864,226 | Blodgett | Aug. 27, 1907 |
| 1,278,045 | Sisson | Sept. 3, 1918 |
| 1,715,812 | Bauer | June 4, 1929 |
| 1,745,889 | Bardet | Feb. 4, 1930 |
| 1,962,432 | Daley | June 12, 1934 |
| 1,972,858 | Almgren | Sept. 11, 1934 |
| 2,216,733 | Brucker | Oct. 8, 1940 |
| 2,218,722 | Ross | Oct. 22, 1940 |
| 2,225,549 | Card | Dec. 17, 1940 |
| 2,248,786 | Rowe | July 8, 1941 |
| 2,277,108 | Jackson | Mar. 24, 1942 |